(12) United States Patent
Matsuzaki et al.

(10) Patent No.: US 8,483,927 B2
(45) Date of Patent: Jul. 9, 2013

(54) SPEED CHANGING CONTROL SYSTEM FOR A VEHICLE

(75) Inventors: Yushi Matsuzaki, Sakai (JP); Susumu Umemoto, Nara (JP); Atsushi Shinkai, Tondabayashi (JP); Atsushi Haramoto, Sakai (JP)

(73) Assignee: Kubota Corporation, Osaka (JP)

( * ) Notice: Subject to any disclaimer, the term of this patent is extended or adjusted under 35 U.S.C. 154(b) by 38 days.

(21) Appl. No.: 13/232,639

(22) Filed: Sep. 14, 2011

(65) Prior Publication Data

US 2012/0191307 A1 Jul. 26, 2012

(30) Foreign Application Priority Data

Jan. 20, 2011 (JP) ................................. 2011-009936
Jun. 17, 2011 (JP) ................................. 2011-135754

(51) Int. Cl.
*B60T 8/32* (2006.01)
*G05D 1/00* (2006.01)
*G06F 7/00* (2006.01)
*G06F 17/00* (2006.01)

(52) U.S. Cl.
USPC ............................................. 701/93; 701/95

(58) Field of Classification Search
USPC .... 701/93, 95, 51, 50, 22; 318/400.23; 477/8, 477/52; 74/473.11; 474/28
See application file for complete search history.

(56) References Cited

U.S. PATENT DOCUMENTS

| 7,037,236 | B2 * | 5/2006 | Ishibashi et al. ................. 477/52 |
| 7,276,016 | B2 * | 10/2007 | Ishii et al. ..................... 477/115 |
| 7,344,473 | B2 * | 3/2008 | Ishibashi et al. ................. 477/52 |
| 7,601,095 | B2 * | 10/2009 | Hasegawa et al. ............. 477/180 |
| 8,287,433 | B2 * | 10/2012 | Kishii ........................... 477/181 |
| 2008/0004141 | A1 * | 1/2008 | Toyoda et al. .................... 474/28 |
| 2008/0070747 | A1 | 3/2008 | Kitamura et al. |
| 2011/0178684 | A1 * | 7/2011 | Umemoto et al. .............. 701/51 |
| 2011/0239804 | A1 * | 10/2011 | Hase et al. ................. 74/473.11 |
| 2011/0245034 | A1 * | 10/2011 | Yoshida et al. .................... 477/8 |
| 2011/0246009 | A1 * | 10/2011 | Hase et al. ...................... 701/22 |
| 2012/0081051 | A1 * | 4/2012 | Kobayashi et al. ....... 318/400.23 |
| 2012/0191307 | A1 * | 7/2012 | Matsuzaki et al. ............. 701/51 |
| 2012/0271498 | A1 * | 10/2012 | Kobayashi ..................... 701/22 |
| 2012/0271519 | A1 * | 10/2012 | Nishi et al. ..................... 701/50 |

FOREIGN PATENT DOCUMENTS

| JP | 5338474 A | 12/1993 |
| JP | 2004150454 A | 5/2004 |
| JP | 2008133896 A | 6/2008 |

* cited by examiner

*Primary Examiner* — Thomas Black
*Assistant Examiner* — Robert Payne
(74) *Attorney, Agent, or Firm* — The Webb Law Firm

(57) ABSTRACT

A speed changing control system for a vehicle including a speed changing device for speed changing a rotational power from an engine and outputting the resultant power, a speed changing control unit for setting a speed change ratio of the speed changing device, and an engine control unit for setting an engine rotational speed of the engine. Based on an operational instruction in response to a driver's operation, a rotational speed reducing instruction is given to the engine control unit for reducing an engine rotational speed set by the engine control unit by a predetermined amount. Also, a speed changing ratio changing instruction is given to the engine control unit for requesting, to a speed changing control unit, a change of the speed change ratio for compensating for the reduction in the engine rotational speed by the rotational speed reducing instruction so as to maintain the vehicle speed.

13 Claims, 12 Drawing Sheets

Fig.5

SPEED CHANGING CONTROL SYSTEM FOR A VEHICLE

BACKGROUND OF THE INVENTION

1. Field of the Invention

The present invention relates to a speed changing control system for a vehicle including a speed changing device for speed-changing a rotational power from an engine and outputting the resultant speed-changed power, a speed changing control unit for setting a speed change ratio of the speed changing device and an engine control unit for setting an engine rotational speed of the engine.

2. Description of the Related Art

As described above, with a speed changing control system of the above-noted type in operation, through coordinated controlling of the engine control unit and the speed changing control unit, it becomes possible to maintain the vehicle speed at a constant value in both low and high engine rotational speed ranges.

For instance, JP 5-338474 A (paragraph [0004], FIG. 10), shows a movable agricultural machine in which a speed changing actuator for actuating a stepless speed-changing mechanism is provided so that the traveling speed (vehicle speed) is changed steplessly by the control of this actuator. More particularly, in this movable agricultural machine, a rotation sensor and an accelerator actuator are provided for effecting respectively detection and adjustment of the engine rotation. In operation, by operating the respective actuators in such a manner as to obtain a desired traveling speed, the speed change ratio of the stepless speed changing mechanism and the engine rotation are controlled in correlation (coordination) with each other. And, at the time of light-load traveling, the engine is set to a low rotational speed for a lower fuel consumption rate to achieve economical traveling whereas at the time of high-load traveling, the engine is set to a high output to allow traveling at a fixed desired speed.

If the rotational speed of the engine can be lowered with keeping the vehicle speed constant, the fuel consumption rate can be lowered correspondingly, thus being advantageous for energy saving. However, as spare or excess amount (un-used portion) of the engine torque is diminished, the risk of occurrence of engine stall becomes higher, thus inviting inconvenience of vehicle travel becoming unstable. The spare amount of engine torque varies depending on e.g. traveling condition, the work condition. In the case of steep slope traveling or muddy road traveling, the spare amount of engine torque is limited as a matter of course. The driver can feel (grasp) such situation or condition, but the conventional speed changing control system is not equipped with any operational line or mechanism capable of operably associating such driver grasped condition with the energy saving driving described above.

SUMMARY OF THE INVENTION

In view of the above-described state of the art, an object of the present invention is to provide a speed changing control system having a control function that allows effective utilization of driver's feel or grasping of spare amount in engine power for energy-saving driving.

In a speed changing control system for a vehicle including a speed changing device for speed changing a rotational power from an engine and outputting the resultant speed-changed power, a speed changing control unit for setting a speed change ratio of the speed changing device and an engine control unit for setting an engine rotational speed of the engine, for accomplishing the above-noted object, the inventive system comprises:

an operational instrument for delivering an operational instruction in response to a driver's operation; and a speed changing module, wherein based on said operational instruction, said speed changing module is configured to provide said engine control unit with a rotational speed reducing instruction for reducing an engine rotational speed set by said engine control unit by a predetermined amount, and wherein said speed changing module is configured also to request, to said speed changing control unit, a change of the speed change ratio for compensating for said reduction in the engine rotational speed by said rotational speed reducing instruction so as to maintain the vehicle speed.

With the above arrangement, if the driver currently feels a certain spare amount in the engine torque and desires to reduce the engine rotational speed for the purpose of e.g. energy saving driving, the driver can operate the operational instrument such as a button, a lever. In response to this, a rotational speed reducing instruction for reducing the engine rotational speed by a predetermined amount (which is set in advance can be provided) is delivered to the engine control unit. Moreover, simultaneously therewith, a speed change ratio changing instruction is delivered to the speed changing control unit so as to change the speed change ratio in compensation for the reduction in the engine rotational speed so as to maintain the vehicle traveling speed. Namely, only by operating the operational instrument during vehicle traveling, a driving operation for reducing the engine rotational speed can be easily realized with maintaining the vehicle traveling speed.

If the engine rotational speed is reduced excessively with keeping the vehicle speed, this will deplete the spare amount in the engine torque, whereby the vehicle run will become unstable, thus inviting the risk of engine stall. Further, depending on the condition of the wheel contacting ground surface or in the case of some utility work being carried out, such condition or change in the work condition may result in increase in the load to the engine. For this reason, when the driver feels instability in the vehicle run, it is preferred that the engine rotational speed which has once been reduced can now be reverted to the original speed by a simple operation. To this end, according to one preferred embodiment of the present invention, said operational instrument is configured to be capable of delivering also a reverting operational instruction for canceling the reduction in the engine rotational speed and the associated compensatory change in the speed change ratio.

As some non-limiting examples of specific arrangements of the operational instrument for instructing a reduction in the engine rotational speed as well as its reverting (i.e. regaining in the engine rotational speed), there can be cited an arrangement of providing a speed reducing button and a speed reverting button side by side, or providing a seesaw switch or a pivotal lever capable of selectively providing a speed reducing instruction or a speed reverting instruction depending on its pivotally operated direction.

If the stability of vehicle travel is to be taken into consideration, it is preferred that the operation for reducing the engine rotational speed with maintaining the vehicle speed be effected stepwise. To this end, according to one preferred embodiment of the present invention, said engine rotational speed reduction and said compensatory speed change ratio change are implemented in a plurality of steps, and the reduced engine rotational speed and the compensatory speed change ratio change are reverted in the plurality of steps in response to the reverting operational instruction.

Not only in the case of the stepwise speed changing type speed changing device as a matter of course, but also in the case of the stepless speed changing type speed changing device, the speed change ratio changes for the speed changing device are often set stepwise in advance. In the case of such arrangement, if the reduction amount in the engine rotational speed and the resultant change in the speed change ratio in response to driver's one operation are made in agreement with one step change amount of speed change ratio, this will be advantageous in that the construction for the speed changing control will be made simple. Therefore, according to one preferred embodiment of the present invention, the speed change ratios are set in a plurality of steps so as to provide a plurality of speeds and the engine rotational speed reduction and the compensatory speed change ratio change in response to the operational instruction corresponds to one step change of speed.

In case the engine rotational speed reducing process in response to the rotational speed reducing instruction and the speed change ratio changing process in response to the speed change ratio changing instruction are effected sequentially, for instance, if the changing process of the speed change ratio is effected after reduction in the engine rotational speed, this will result in temporary or momentary reduction in the vehicle speed, which is followed immediately by rise in the vehicle speed. This will be detrimental to vehicle traveling performance. Therefore, according to one preferred embodiment of the present invention, an engine rotational speed reducing process based on the rotational speed reducing instruction and a speed change ratio changing process based on the speed change ratio changing instruction are configured such that control timing thereof are adjusted relative to each other so as to reduce the amount of change in the vehicle speed. With this arrangement, there can be realized a control scheme which achieves maximum agreement between a unit time change amount of the vehicle speed reduction by the engine rotational speed reducing process and a unit time change amount of the vehicle speed increase by the speed change ratio changing process. One simple method to achieve this is to provide a delay in one process having the larger change ratio (faster processing speed), so that this one process having the larger change ratio may be adapted to the other process having the smaller change ratio (slower processing speed). In any case, by executing the engine rotational speed reducing process and the speed change ratio changing process in maximum coordination with each other, change occurring in the vehicle speed during executions of these processes can be minimized.

With today's engines (e.g. common-rail type diesel engine), the engine operation is controlled with precise estimation/calculation of the engine load. Therefore, in such case, when the engine load reaches a level at which an engine stall can occur, it is desirable to cancel the engine rotational speed reducing process based on a rotational speed reducing instruction. To realize this, according to one preferred embodiment of the present invention, the system further comprises an engine load determining section for determining whether an engine load has exceeded a predetermined level or not, and when it is determined that the engine load has exceeded the predetermined level, there is outputted a reverting operational instruction for canceling the reduction in the engine rotational speed and the associated compensatory change in the speed change ratio.

In addition to the engine load exceeding a predetermined level, there are other certain cases when forcible cancellation of the engine rotational speed reducing process is desirable. Some examples are a case when the vehicle drive is ended with turning the engine key off and a case when vehicle drive has shifted to a general road travel where traveling at a fixed speed is not possible. Therefore, according to one preferred embodiment of the present invention, the system further comprises a forcible reverting control section configured to forcibly output, in response to establishment of a predetermined canceling condition, a reverting operational instruction for canceling the reduction in the engine rotational speed and the associated compensatory change in the speed change ratio.

During vehicle travel, in order to adapt to some change in the traveling condition or driving condition, a speed change operational instrument (e.g. a speed change lever) for varying the speed position of the speed changing device or an accelerator operational instrument (e.g. an accelerator lever) for adjusting the engine rotational speed may sometimes be operated. In such case when the engine rotational speed or the speed change ratio (vehicle speed) used as a new reference for control has been changed by the driver's intension, continuation of the engine rotational speed reducing process at this newly set engine rotational speed or vehicle speed will also be useful for the purpose of energy saving. Therefore, according to one preferred embodiment of the present invention, when a speed change position is switched from a first speed change position which was set by the speed change operational instrument for operating the speed changing device to a second speed change position, the rotational speed reducing instruction which was provided for the first speed change position is carried on for the second speed change position. Further, according to another embodiment, when an accelerator position is switched from a first accelerator position which was set by the accelerator operational instrument for adjusting the engine rotational speed to a second accelerator position, the rotational speed reducing instruction which was provided for the first accelerator position is carried on for the second accelerator position.

According to one preferred embodiment of the present invention, a low-range engine rotational speed included in the rotational speed reducing instruction to be provided to the engine control unit is calculated in such a manner that the reduction in the engine rotational speed by this low-range engine rotational speed can be compensated for by the change in the speed change ratio by the speed changing control unit. With application of this arrangement, when a reduction in the engine rotational speed is requested, the system first judges whether there is any spare in the speed change ratio (increase in the speed) based upon a current speed change ratio which is the presently used speed change ratio. Then, the amount of engine rotational speed reduction to be implemented will be calculated in accordance with this spare amount. With this, the engine rotational speed reducing process of the present invention can be implemented as long as there is spare amount left in the speed increasing side of the speed changing device.

Incidentally, in case there is no spare amount left in the speed change ratio (speed increase), this engine rotational speed reducing process cannot be implemented. However, if a speed change operation to the speed reducing side is effected to the speed changing device, this will create some spare amount on the speed increasing side, whereby the implementation of the engine rotational speed reducing process now becomes possible. Therefore, advantageously, there can be adopted an arrangement wherein in case change in the speed change ratio for compensating for the reduction in the engine rotational speed is not possible by the speed changing control unit, the delivery of the rotational speed reducing instruction to the engine control unit is delayed until the change in the speed change ratio becomes possible.

In general, the high speed position of a high/low auxiliary speed changing device employed in a work vehicle is used at the time of road traveling in which accelerator operations are frequently effected. As a result, there occur frequent variations in the engine rotational speed. Under such driving condition, continuation of the engine rotation reducing process is not desirable. Therefore, according to one preferred embodiment of the present invention, said speed changing device consists of a main speed changing device for effecting the change of speed change ratio for compensating for the reduction in the engine rotational speed and an auxiliary speed changing device having a plurality of stages, and the reduction in the engine rotational speed and the associated compensatory change in the speed change ratio are cancelled based upon a speed change switching instruction for switching said auxiliary speed changing device from a low speed stage to a high speed stage.

In case the reduction in the engine rotational speed invites a rotational speed change which is inexpedient for an operation of an external work implement, the driver needs to grasp this. If a power takeoff (PTO) speed changing device is provided, change in the PTO rotational speed can be restricted by adjusting the speed position of this PTO speed changing device. Therefore, in the case of an embodiment wherein a PTO speed changing device is provided in a PTO transmission line for transmitting the rotational power from the engine to the external implement, advantageously, at the time of reduction in the engine rotational speed based upon the rotational speed reducing instruction, there is issued an alarm which prompts selection of a speed change potion that reduces the reduction in the PTO rotational speed by the PTO speed changing device. The PTO speed changing device can be either a multiple-step speed changing device or a stepless speed changing device.

BRIEF DESCRIPTION OF THE DRAWINGS

FIG. 5 is an explanatory view diagrammatically illustrating the speed changing control system in this embodiment.

DETAILED DESCRIPTION OF THE PREFERRED EMBODIMENTS

Before embodiments of the present invention are specifically described, there will be explained the basic flow of an engine rotational speed reducing process in a speed changing control system relating to the present invention, with reference to the diagrams of FIG. 1 and FIG. 2.

Figure 1:
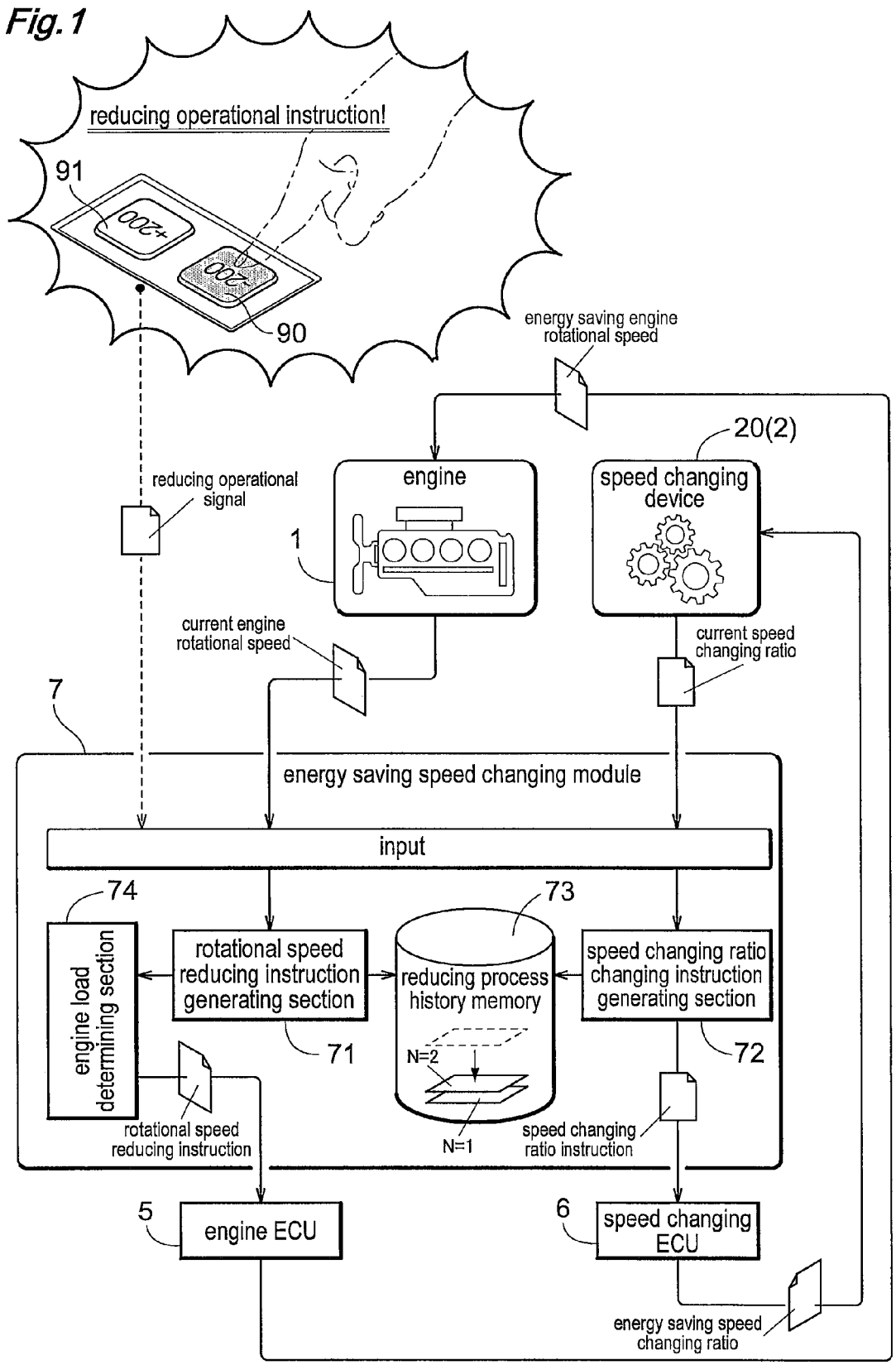
FIG. 1 is a diagram showing the basic flow of an engine rotational speed reducing process in a speed changing control system according to the present invention.
Figure 2:
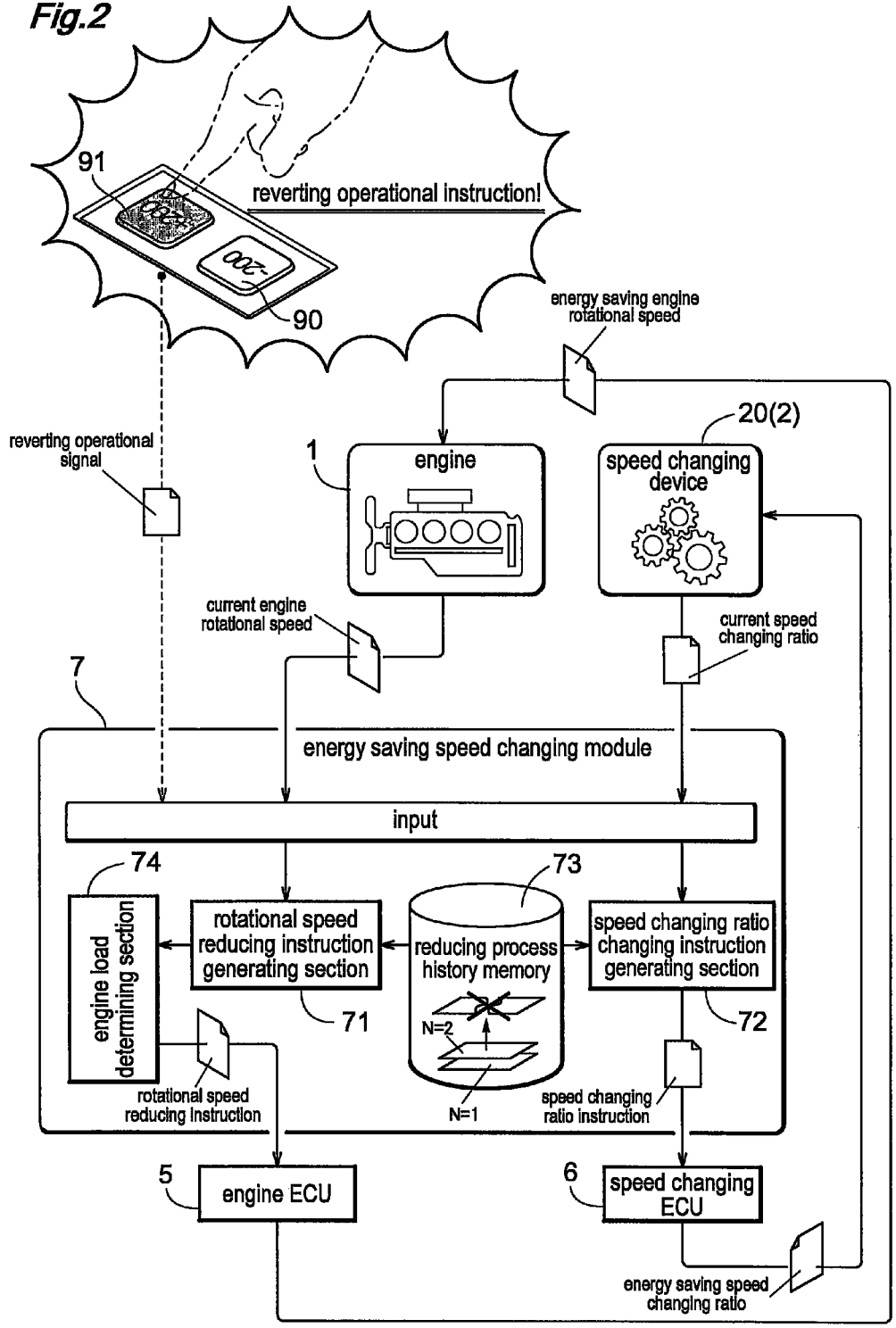
FIG. 2 is a diagram showing the basic flow of an engine rotational speed reverting process in the speed changing control system according to the present invention.

FIG. 1 diagrammatically illustrates the flow of control wherein as being triggered by a driver's spontaneous operational input (in this case, an operation on an engine rotational speed reducing button 90 acting as an example of an energy saving button), the engine rotational speed is reduced and at the same time the speed change ratio is changed so as to maintain the current vehicle speed (to be referred to simply as "vehicle speed" hereinafter). While the driver is driving a work vehicle and carrying out a plowing work at a constant vehicle speed, if the driver desires to reduce the engine rotational speed for the purpose of energy saving driving for instance, the driver will press the engine rotational speed reducing button 90 (this will be referred to simply as the "reducing button" hereinafter). In the figure, there is shown a mark "−200" meaning 200 rpm reduction of the rotational speed. However, this numerical value is just one non-limiting example. In response to this pressing operation of the reducing button 90, a reducing operational signal as a reducing operational instruction is outputted to an energy saving speed changings module 7. This energy saving speed changing module 7, when being triggered by the reducing operational instruction, generates a rotational speed reducing instruction and a speed change ratio changing instruction. The rotational speed reducing instruction is an instruction for requesting an engine control unit (to be referred to simply as "engine ECT" hereinafter) 5 to reduce the current engine rotational speed to an energy saving engine rotational speed which is set in advance as a rotational speed reduced by a predetermined rotational speed relative to the current rotational speed as the reference. The speed change ratio changing instruction is an instruction for requesting the speed changing device 2 or a speed changing control unit (to be referred to simply as "speed changing ECT" hereinafter) 6 to provide a compensatory speed change ratio, i.e. a speed change ratio for compensating for the reduction in the vehicle speed resulting from the engine rotational speed reduction to the energy saving engine rotational speed, relative to the current speed change ratio of the speed changing device 2.

The energy saving process as the "output" of the rotational speed reducing instruction and the speed change ratio changing instruction can be executed for a plurality of times. That is, with each pressing operation by the driver on the engine rotational speed reducing button 90, a rotational speed reducing instruction and a speed change ratio changing instruction are outputted, thus creating an engine rotation which is reduced stepwise. And, in each time, the speed change ratio of the speed changing device 2 is changed to keep the vehicle speed substantially constant. Needless to say, if the spare amount in the engine torque is used up, an engine stall will occur. Therefore, the number of times of this energy saving process is limited.

When the traveling load or the work load increases and the driver feels instability in the vehicle traveling, the energy saving process which has been executed stepwise needs to be reverted stepwise. FIG. 2 illustrates the flow of a reverting process which is executed to this end. In this, as being triggered by a driver's spontaneous operational input (in this case, an operation of the engine rotational speed reducing button 91 acting as the energy saving button), the engine rotational speed which has been reduced for energy saving driving is reverted step by step and the speed change ratio is also changed accordingly to so as to maintain the current vehicle speed (to be referred to simply as "vehicle speed" hereinafter). In case the engine rotational speed reducing process has been executed in a plurality of steps so far for energy saving driving, firstly, an engine rotational speed reduction reverting button (to be referred to simply as "a reverting button" hereinafter) 91 is pressed. In the figure, there is shown a mark "+200" meaning 200 rpm reverting of the rotational speed. However, this numerical value is just one non-limiting example. In response to this pressing operation of the reverting button 91, a reverting operational signal as a reverting operational instruction is outputted to the energy saving speed changing module 7. This energy saving speed changing module 7, when being triggered by the reverting operational instruction, generates a new rotational speed reducing instruction and a new speed change ratio changing instruction. This rotational speed reducing instruction means a reduction from the engine rotational speed which was used as the reference rotational speed in the initial energy saving process, and hence this is actually an instruction for increasing the current engine rotational speed. As this rotational speed "reducing" instruction is given to the engine ECU 5, the reduction amount in the energy rotational speed which was given at the corresponding step is cancelled out, so that the engine rotational speed will be increased substantively. At the same time, it is necessary to create a compensatory speed change ratio, that is, a speed change ratio for maintaining the current vehicle speed by compensating for the change in the engine rotational speed due to the cancelled engine rotation reduction amount, eventually the increase in the vehicle speed resulting from the increase. The speed change ratio changing instruction is an instruction for requesting this compensatory speed change ratio to the speed changing device 2 or the speed changing control unit 6 to this end. This reverting process can be executed in a plurality of steps corresponding to the number of steps in the energy saving process which have been executed based on the reference energy rotational speed.

Figure 3:
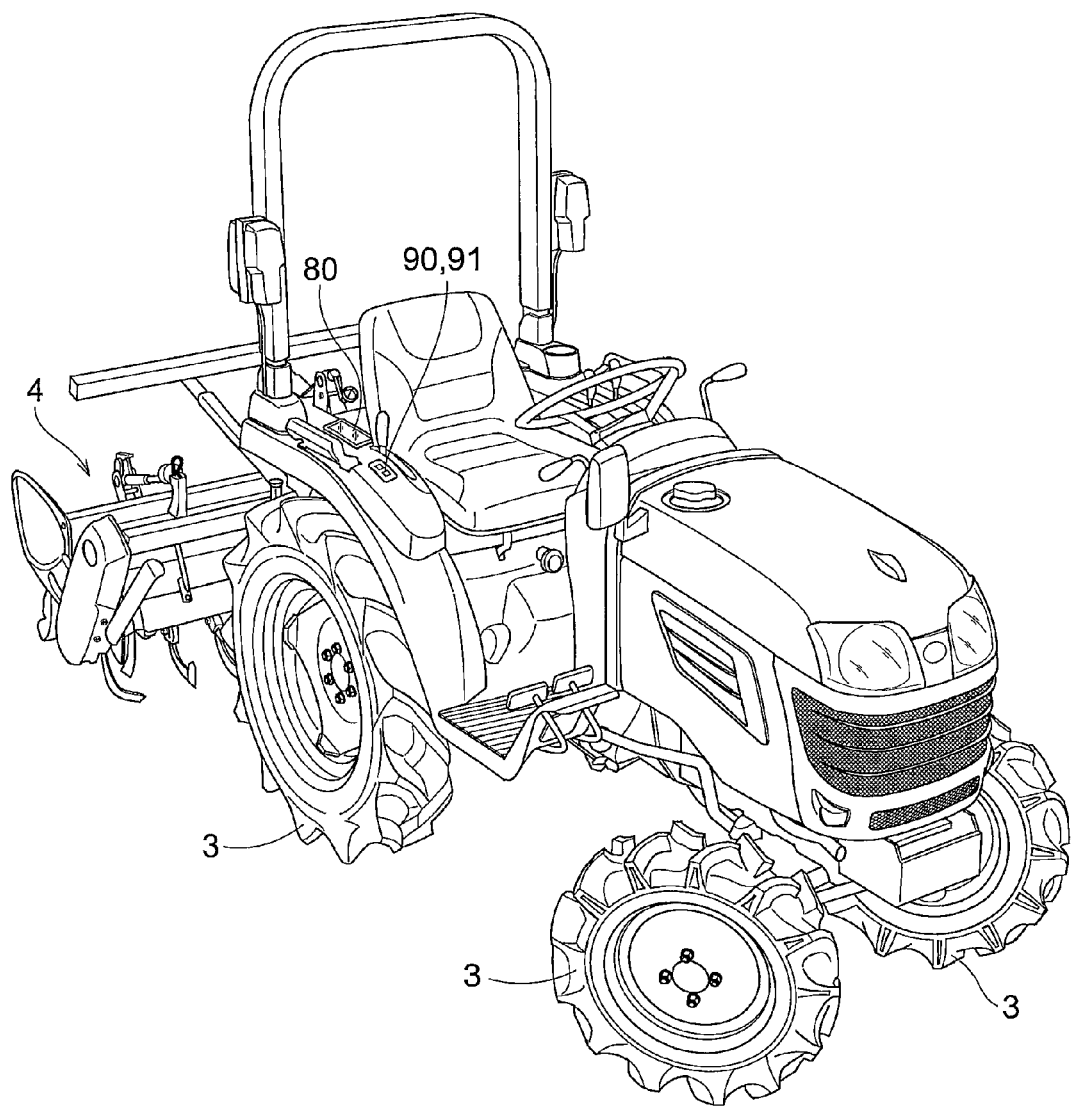
FIG. 3 is a perspective view of a tractor mounting the speed changing control system according to the present invention.
Figure 4:
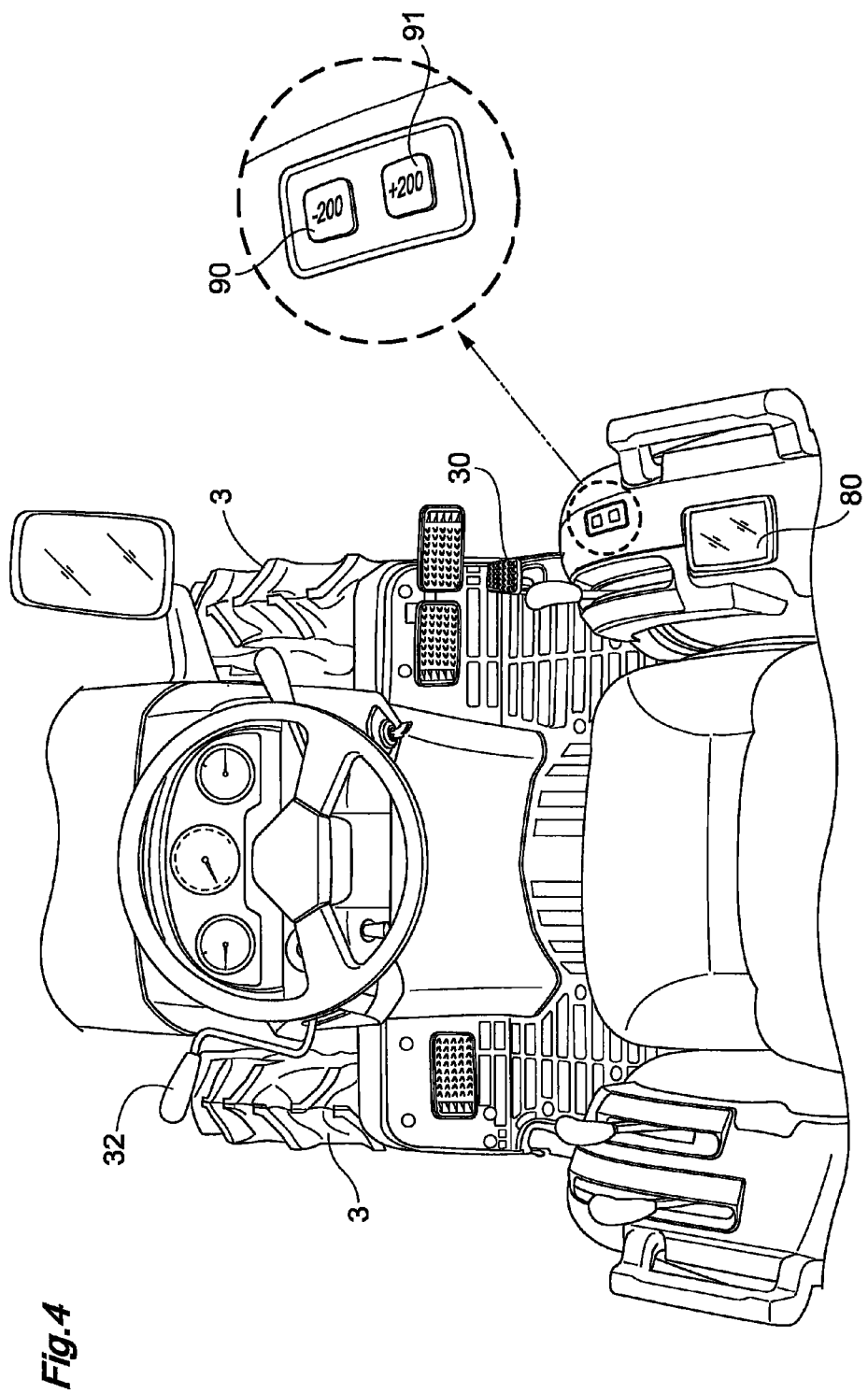
FIG. 4 is an overhead view of a driver's seat having various kinds of operational instruments provided in a driver's section of the tractor.
Figure 5:
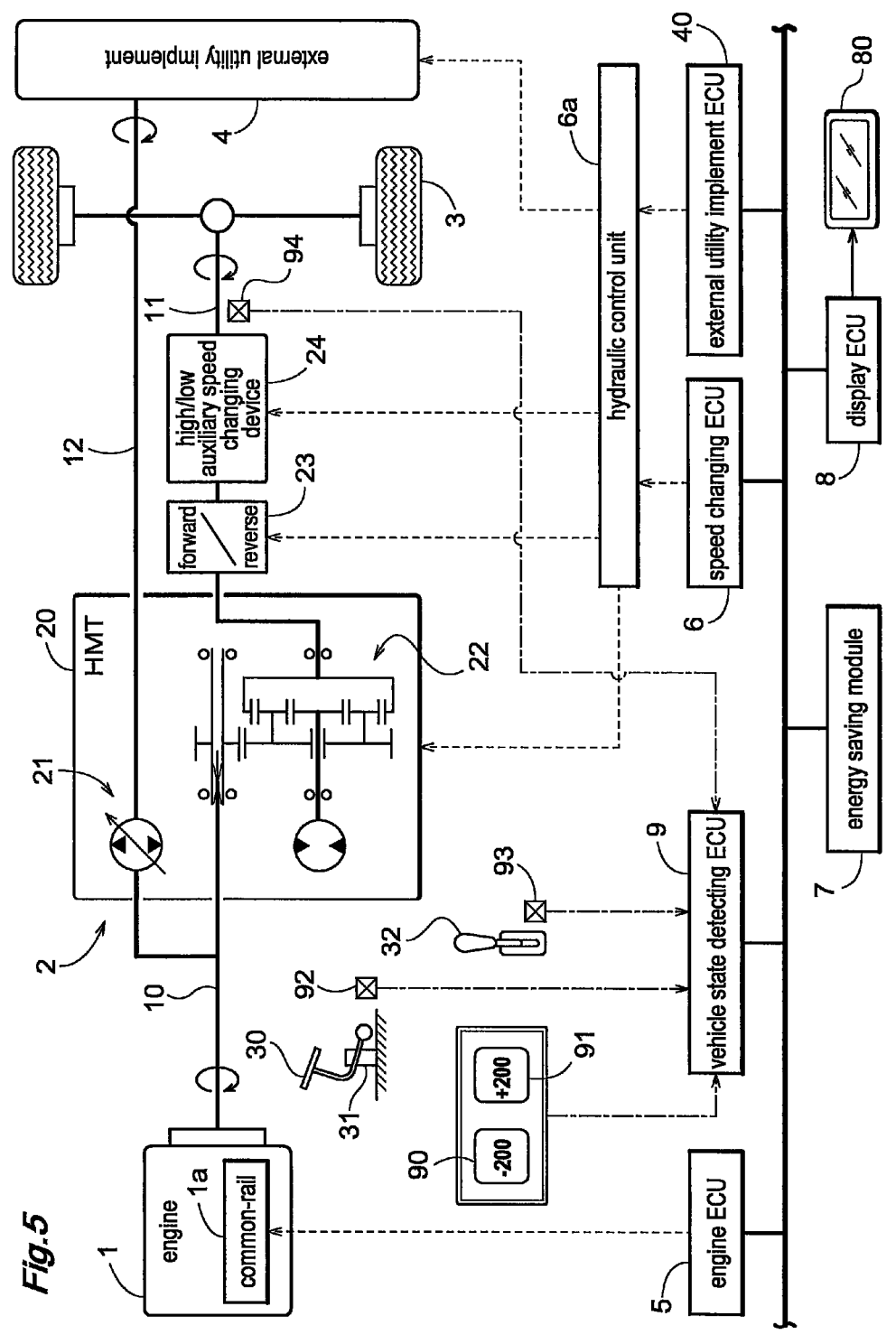

Next, a specific embodiment of the speed changing control system configured for providing the above-described basic engine rotational speed reducing process will be described. FIG. 3 is a perspective view of a tractor mounting the speed changing control system according to the present invention. FIG. 4 is an overhead view of a driver's seat having various kinds of operational instruments provided in a driver's section of the tractor. FIG. 5 is an explanatory view diagrammatically illustrating the speed changing control system in this embodiment.

This tractor mounts, at a rear potion of the vehicle body supported on wheels 3, an external utility implement 4 which is constructed as a plowing device in this embodiment. An engine 1 mounted at a front portion of the vehicle body is a diesel engine 1 whose rotation is controlled by a common-rail 1a arrangement. Power from an output shaft 10 of the engine 1 is transmitted to a hydro-mechanically operated type stepless speed changing device ("HMT" hereinafter) 20, a forward/reverse switching device 23 and an auxiliary speed changing device 24 for effecting speed changing operations in a plurality of steps (in this case, high and low two steps) to a speed change output shaft 11 for eventually rotating the drive wheels (front wheels and/or rear wheels) 3. The HMT 20, the forward/reverse switching device 23 and the auxiliary speed changing device 24 together constitute a speed changing device 2. Further, a portion of the power branched from the output shaft 10 of the engine 1 is transmitted via a power takeoff (PTO) transmission line 12 to the external utility implement 4 such as the plowing machine mounted on the tractor.

The HMT 20 includes a hydrostatic speed changing mechanism 21 consisting essentially of a swash plate, variable displacement type hydraulic pump and a hydraulic motor rotatable by a hydraulic pressure from the hydraulic pump to output a power and a planetary gear mechanism 22. The planetary gear mechanism 22 is configured to input the power from the output shaft 10 of the engine 1 and the power from the hydraulic motor and to output the resultant speed-changed output to the forward/reverse switching device 23.

With this hydrostatic speed changing mechanism 21 in operation, as the power from the engine 1 is inputted to a pump shaft, an amount of pressure oil is fed from the hydraulic pump to the hydraulic motor, so that the hydraulic motor is rotatably driven by this pressure oil from the hydraulic pump, thus rotating the motor shaft. The rotation of the hydraulic motor is transmitted via the motor shaft to the planetary gear mechanism 22. With the hydrostatic speed changing device 21 in operation, as a cylinder operably coupled with the swash plate of the hydraulic pump is displaced, the angle of the swash plate is changed thereby to selectively provide a forward rotation state, a reverse rotation state or a neutral state located between the forward rotation state and the reverse rotation state. In addition, whether speed-changed into the forward rotation state or the reverse rotation state, the rotational speed of the hydraulic pump is changed steplessly, thus providing stepless change of the rotational speed of the hydraulic motor (rotation per unit time). As a result, the rotational speed of the power transmitted from the hydraulic motor to the planetary gear mechanism 22 is changed steplessly. Further, with the hydrostatic speed changing mechanism 21, when the swash plate thereof is located at the neutral position, the rotation of the hydraulic motor by the hydraulic pump is stopped. As a result, the output from the hydraulic motor to the planetary gear mechanism 22 is stopped.

The planetary gear mechanism 22 includes a sun gear and three planet gears disposed in equidistant distribution around the sun gear, a carrier for rotatably supporting the respective planet gears, a ring gear meshed with the three planet gears, and an output shaft 11 coupled to the forward/reverse switching device 23. Incidentally, in this embodiment, the carrier forms, in its outer periphery, a gear portion to be meshed with an output gear mounted on the engine output shaft 10 and is rotatably supported to a boss portion of the sun gear.

With the above-described arrangement, this HMT 20 is capable of steplessly speed-changing the power transmitted to the drive shaft 3 by changing the swash plate angle of the hydrostatic speed changing mechanism 21. This swash plate control is realized by hydraulic control of the hydraulic control unit 6a which is operated based on control instructions from the speed changing ECU 6.

The swash plate control is possible not only by input of an operational signal by a manual operation, but also by input of a mechanically generated operational signal. In this regard, a speed changing pedal 30 functioning as a speed changing operational instrument for manual input is disposed on a floor on the right side of the driving operational area. The speed changing pedal 30 is provided with a position retaining mechanism 31 for retaining this speed changing pedal 30 at a desired position. Further, there is also provided a pedal sensor 92 which detects an operational amount (in this case, a pivoted angle) provided by a driver's stepping on the speed changing pedal 30 and generates a detection signal indicative of this operational amount. The pedal sensor 92 is constituted of e.g. a potentiometer. Further, in the driving operational area, there are also provided, as components especially relating to the present invention, an engine rotational speed reducing button 90 and an engine rotational speed reverting button 91 as operational instruments for issuing operational instructions by the driver's operations for adjusting the engine rotational speed, an accelerator lever 32 and a lever sensor 33 for detecting an operational position of the accelerator lever 32 and generating an operational signal. In this embodiment, the engine rotational speed reducing button 90 and the engine rotational speed reverting button 91 are disposed on a side panel covering an upper side of a rear wheel fender, as shown in FIG. 4. These buttons could alternatively be provided on the left side panel or on a steering wheel or on a front panel forwardly of the steering wheel.

The control line for this speed changing control system includes the engine control unit (to be referred to simply as "engine ECU" hereinafter) 5, the speed changing control unit (to be referred to simply as "speed changing ECU" hereinafter) 6, an energy saving speed changing module 7, a display ECU 8, a vehicle state detecting ECU 9, an external utility implement ECU 40, etc. And, these components are connected via a vehicle mounted LAN to be capable of data transmission to/from each other.

The vehicle state detecting ECU 9 inputs signals from the various sensors mounted on the tractor as well as operational input signals indicative of states of the operational instruments operated by the driver and effects signal conversions, evaluation calculations when necessary, and outputs the resultant signals or data to the vehicle mounted LAN. Among the signals inputted to this vehicle state detecting ECU 9, as those related in particular to the present invention, there can be cited a signal from the pedal sensor 92 that detects an operational amount of the speed changing pedal 30, a signal from a lever sensor 93 that detects an operational amount of the accelerator lever 32, a signal from a rotation sensor (or vehicle speed sensor) 94 that detects a rotational speed of the speed changing output shaft 11 (this signal can be used for calculating the tractor traveling speed also), signals from the engine rotational speed reducing button 90 and the engine rotational speed reverting button 91 which signals will be detailed later.

The engine ECU 5, as is well-known, is a core functional component for electronic control of the engine 1. This ECU 5 effects various types of engine control operations such as a constant rotational speed control and a constant torque control, based upon preset programs, in accordance with the operational conditions of the engine 1 which can be estimated based on external operation input signals and internal sensor signals, etc.

The speed changing ECT 6 controls the various hydraulic control components of the speed changing device 2 via the hydraulic control unit 6a based on external operation input signals and internal sensor signals, etc. and sets a speed change ratio of the speed changing device 2 in order to cause the tractor to travel at a desired speed. The external implement ECU 40 generates control signals for controlling the external utility implement 4. The display ECU 8 generates control signals for causing a monitor 80 comprised of a liquid crystal display provided in the driving operational area to display various kinds of alarm (or reporting) information. In this embodiment, as shown in FIG. 2, the monitor 80 is provided as a liquid crystal panel disposed on the side panel adjacent the driver's seat (right side) and in close vicinity of a switch panel consisting of the engine rotational speed reducing button 90 and the engine rotational speed reverting button 91. However, instead of this or in addition to this, the monitor 80 can be incorporated within the front panel including a vehicle speedometer, a tachometer, etc. In any case, this monitor 80 displays various kinds of information such as information about vehicle operations. Of these, as those particularly related to the present invention, the following display events can be cited.

(1) During execution of the engine rotational speed reducing process explained above with reference to FIG. 1 or the engine rotational speed reverting process explained above with reference to FIG. 2, the reduction amount of the engine rotational speed is displayed.

(2) An illuminated display is effected for showing ongoing state of the engine rotational speed reducing process explained above with reference to FIG. 1 or the engine rotation speed reverting process explained above with reference to FIG. 2. This illuminated display can be effected with providing an LED separately from the liquid crystal panel. Further, as this process is intended for energy saving, preferably, this display is effected in the form of a blue light illumination indicative of the energy saving.

(3) While the object of this control is energy saving, in case a PTO work is going on, the control results also in reduction in the engine rotational speed (that is, the PTO rotational speed) if the vehicle speed is kept constant, so that the control causes a change in the ongoing utility work such as a change in the work pitch. Therefore, if such change exceeds a predetermined value, a message informing this is displayed to the driver. In this, preferably, a voice alarm can be effected in place of or in addition to this message display.

The energy saving speed changing module 7 is a control module for realizing a temporary engine rotational speed reducing process. The energy saving speed changing module 7 has two important functions as follows.

(1) Based on an operational instruction delivered from the operational instrument operated by the driver, which instrument consists, in this embodiment, of the engine rotational speed reducing button (to be referred to simply as "reducing button" hereinafter) 90 and the engine rotational speed reverting button (to be referred to simply as "reverting button" hereinafter) 91, the module 7 provides the engine ECU 5 with a rotational speed reducing instruction for reducing the engine rotational speed by a predetermined amount for the constant rotational speed control.

(2) There is provided an operational instrument which gives a speed change ratio changing instruction that requests to the speed changing ECU 6 such a change in the speed change ratio, in compensation for reduction in the engine rotational speed which occurred resulting from the rotational speed reducing instruction based on an operation of the reducing button 90, in order to maintain the vehicle speed constant during execution of the constant speed traveling control. In this embodiment, when the reverting button is operated, the delivery of the above-described reverting operational instruction is effected.

Incidentally, in this particular embodiment, with each pressing operation of the reducing button 90, the engine rotational speed is reduced by the unit of 200 rpm from the set rotational speed N0 which is set in advance for the constant speed traveling control. Similarly, with each pressing operation of the reverting button 91, the reduction in the engine rotational speed and the associated compensatory change in the speed change ratio which occurred in response to the immediately previous reducing button operation is cancelled, so that these may be reverted to those prior to the immediately previous reducing button operation.

Further, preferably, the number of times of unit reduction in the engine rotational speed possible by the reducing button 90 is limited to a predetermined value. For instance, in this embodiment, the number is limited to four times, so that the engine rotational speed reduction is possible to the maximum of 800 rpm in total. Needless to say, it is preferred that this predetermined limited number of times be freely set to a desired value.

Figure 6:
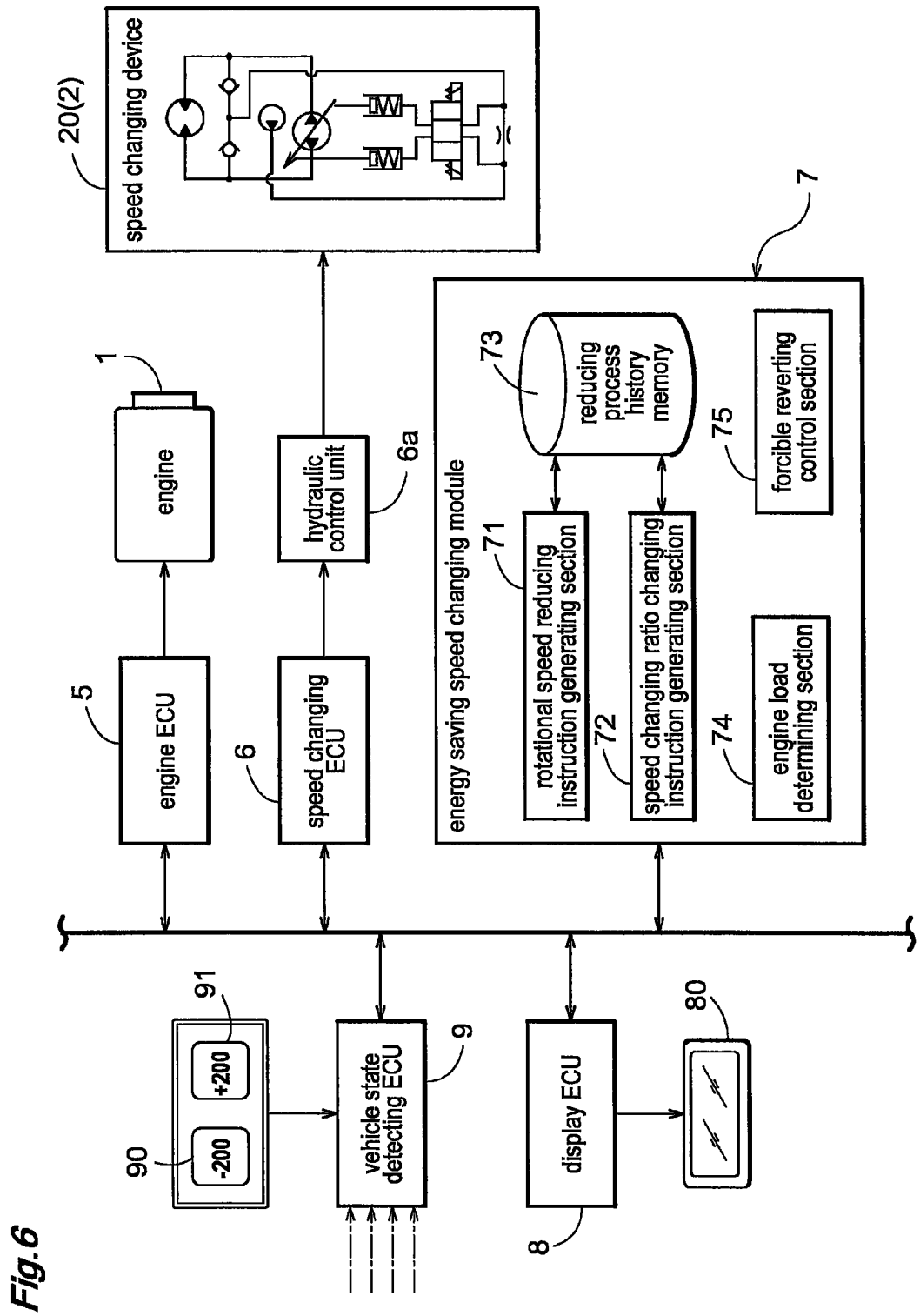
FIG. 6 is a schematic functional block diagram of the speed changing control system.

The energy saving speed changing module 7 is comprised of a computer capable of data exchange with the other ECU's and its functions are realized by means of a computer program. As such, this module can be constructed within another ECU such as the engine ECU 5 or the speed changing ECU 6. In this embodiment, for readiness of explanation, the energy saving speed changing module 7 is described as an independent unit. As shown in FIG. 6, the energy saving speed changing module 7 includes, in order to realize the above-described functions thereof, a rotational speed reducing instruction generating section 71, a speed change ratio changing instruction generating section 72, a reducing process history memory 73, an engine load determining section 74, and a forcible reverting control section 75.

The rotational speed reducing instruction generating section 71 generates a rotational speed reducing instruction for reducing the current engine rotational speed by 200 rpm based on an operational instruction provided in response to a driver's pressing operation of the reducing button 90 and delivers this instruction to the engine ECU 5. In the course of this, the speed change ratio changing instruction generating section 72 calculates a change value of the speed change ratio for compensating for the amount of the reduction in the engine rotational speed by this rotational speed reducing instruction so that this engine rotational speed reduction will not be accompanied by any reduction in the vehicle speed. Based on the change value thus calculated, the speed change ratio changing instruction generating section 72 issues a speed change ratio changing instruction and sends this speed change ratio changing instruction to the speed changing ECU 6. The engine ECU 8 controls the rotational speed of the engine 1 with using, as the reference, a basic engine rotational speed set according to an operational position of the accelerator lever 32. The rotational speed reducing instruction is provided for reducing this basic engine rotational speed, and in this embodiment, the instruction can instruct a plurality of times of reduction, e.g. four times of rotational speed reduction. That is, by the first time of rotational speed reducing instruction, one 200 rpm unit reduction from the basic engine rotational speed is effected. By the second time of rotational speed reducing instruction, another 200 rpm unit reduction, namely, total of 400 rpm reduction from the basic engine rotational speed, is effected. Needless to say, any reduction in the vehicle speed associated with such engine rotational speed reduction will be compensated for by a speed change ratio changing instruction which is issued from the speed change ratio changing instruction generating section 72 in association with each issuance of the rotational speed reducing instruction.

Further, if the driver presses the reverting button 91, a reverting operational instruction is given to the energy saving speed changing module 7 and the rotational speed reducing instruction generating section 7 delivers an instruction to the engine ECU 8 for canceling one step (one time) of the accumulated number of times of the currently set rotational speed reducing instructions. With this, if only one time of rotational speed reducing instruction is set currently, this one time of rotational speed reduction is cancelled, so that the target rotational speed of the engine 1 in the engine ECU 8 becomes or reverts to the original basic engine rotational speed. If two times of rotational speed reducing instructions have been set so far, the rotational speed 200 rpm reduced from the basic rotational speed will become the target rotational speed of the engine 1 in the engine ECU 8. If the reverting button 91 is pressed under the condition of no reduction in the engine rotational speed based on a rotational speed reducing instruction has been set, no rotational speed reducing instruction will be generated. The reverting button 91 is provided only for effecting a canceling process of the rotational speed reduction instruction(s). Needless to say, when the rotational speed reduction is changed based on a reverting operational instruction by an operation of the reverting button 91, simultaneously therewith, any increase in the vehicle speed associated with this change will be compensated for by a speed change ratio changing instruction from the speed change ratio changing instruction generating section 72, whereby the vehicle speed is kept constant.

For this reason, it is necessary to record the number of times of the rotational speed reducing instructions set so far by the rotational speed reducing instruction generating section 71 to the engine ECU 5. To this end, there is provided a reducing process history memory 73. As this reducing process history memory 73, a memory structure such as a stack memory is suitable. Then, in response to generation of a rotational speed reducing instruction, information relating to the rotational speed reduction is written ("pushed") into the reducing process history memory 73. In response to generation of a reverting instruction, the last written information relating to rotational speed reduction is read out and deleted ("popped"). Needless to say, other type of memory structure can be employed also, such as a history memory configured to record chronologically the rotational speed reducing instructions or the reverting operational instructions. In any case, when the rotational speed reducing instruction generating section 71 delivers a rotational speed reducing instruction to the engine ECU 5, the information of 200 rpm engine rotational speed reduction caused by one time operation of the reducing button 90 will be written into the reducing process history memory 73, together, if needed, with information of speed change ratio change associated therewith. Then, with making access to this reducing process history memory 73, it is possible to know the current history of operation(s) of the pressing button 90, the reduction amount of the engine rotational speed currently instructed to the engine ECU 5, and the currently used speed change ratio.

The engine load determining section 74 has a function of determining whether the engine load has exceeded a predetermined level or not. If it is determined that the engine load has exceeded the predetermined level, the engine load determining section 74 generates a reverting instruction for canceling the reduction in the target engine rotational speed and the associated compensatory speed change ratio change which were set by a rotational speed reducing instruction(s). As the engine ECU 5 has the function of controlling engine load, the engine load level needed for the engine load determination can be obtained from the engine ECU 5.

The forcible reverting control section 75 forcibly outputs a reverting operational instruction so as to cancel the reduction in the engine rotational speed set in the engine ECU 5 and the associated compensatory change in the speed change ratio set to the speed change ECU 6, upon establishment of a predetermined canceling condition which is set in advance in addition to the engine load condition. A typical example of such canceling condition is detection of a newly developed situation not requiring the constant speed traveling, such as a case of mode transition from the work traveling mode requiring the constant speed traveling to the general road traveling which needs to be effected with appropriate continuous adjustment of the traveling speed. Further, in case the vehicle driving is completed with turning off the engine key, forcible cancellation of the engine rotational speed reduction is desirable as well.

Incidentally, in case the basic engine rotational speed is adjusted by means of operation of the accelerator operational instrument, the engine rotational speed is changed manually. An arrangement is provided such that in such case too, the rotational speed reducing instruction will be carried on. With this arrangement, even if the accelerator lever 32 as an accelerator operational instrument is operated frequently, the energy saving drive can be maintained. Similarly, the speed change ratio is changed manually by the speed change pedal 30 as a speed changing operational instrument. An arrangement is provided such that in this case too, the change of the engine rotational speed and the subsequent reduction in the rotational speed and the setting of the associated compensatory change in the speed change ratio are effected.

If the engine rotational speed reducing process and the speed change ratio changing process based on the speed change ratio changing instruction are effected sequentially, the vehicle speed will have been dropped at the time of completion of the engine rotational speed reducing process and then, the vehicle speed will return to the original speed in association with the subsequent speed change ratio changing process. Then, in order to minimize such temporary decrease and subsequent increase in the vehicle speed at the time of switchover to the energy saving speed change process, there is employed a technique which adjusts the relative control timings of the processes to minimize such change in the vehicle speed. More particularly, according to this technique, the change in the vehicle speed between the controls is minimized through adjustments of timing of the control unit constituting the engine rotational speed reducing process and the control unit constituting the speed change ratio changing process.

Next, an example of the energy saving speed change process in the speed changing control system having the construction described above will be explained with reference to the flowchart shown in FIGS. 7 through 11.

Firstly, the process checks whether the content of a canceling flag is "0" or not, wherein "1" is set to the canceling flag when it is desired to forcibly cancel the 200 rpm unit of engine rotation reduction according to this energy saving process (#01). In the case of establishment of a preset condition such as transition from a work traveling to a general road traveling, the forcible reverting control section 75 sets the content of the canceling flag to "1" as a reverting operational instruction. If the content of the canceling flag is "1" (NO branching at #01), the forcible canceling process to be detailed later is effected (#60). Unless ending of the energy saving speed change process is being requested, the process returns to step #01. On the other hand, if the content of the canceling flag is "0" (YES branching at #01), the process reads out the number of times of executed reducing process: N indicative of the aggregate number of times of the engine rotational speed reducing process that have been executed so far (#02). The value obtained by multiplying this process times number N: by 200 rpm which is the unit rotational speed reduction amount reduced by one time rotational speed reducing process is the engine rotational speed reduction amount from the basic engine rotational speed. Next, the process checks the content of an operational flag which is set when the speed changing pedal 30 or the accelerator lever 32 is operated during execution of the energy saving speed changing process (#03). As it is necessary to reset the content of this operational flag, for the sake of such resetting, "0" is set to the operational flag at this stage (#04).

Figure 10:
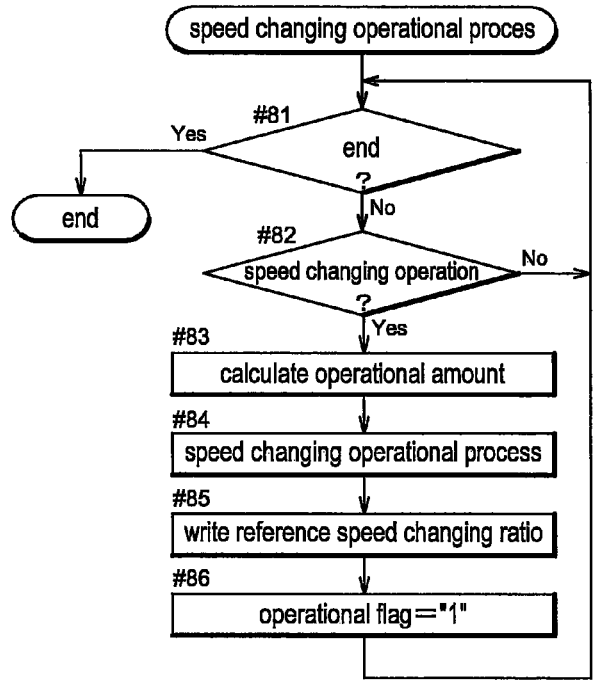
FIG. 10 is a flowchart illustrating the flow of speed changing operational flow.

FIG. 10 shows a speed changing operational process based on an operation of the speed changing pedal 30. First, the process checks presence/absence of issuance of an instruction for ending this speed change operational process (#81). In the case of absence of such ending instruction (NO branching at #81), the process then checks whether a speed changing operation using the speed change pedal 30 has been effected so far or not (#82). In the case of absence of such speed change operation (NO branching at #82), the process returns to step #81. Whereas, in the case of presence of the speed change operation (YES branching at #82), the process calculates its operational amount (#83). Further, based on the calculated operational amount, a speed change process is effected (#84) and a speed change ratio realized thereby is recorded as the reference speed change ratio (#85). Lastly, the process sets "1" to the operational flag (#86). This speed change operational process is effected in the speed change ECU 6, whereas the reading of the recorded reference speed change ratio and the content checking of the operational flag can be effected in the energy saving speed changing module 7.

Figure 11:
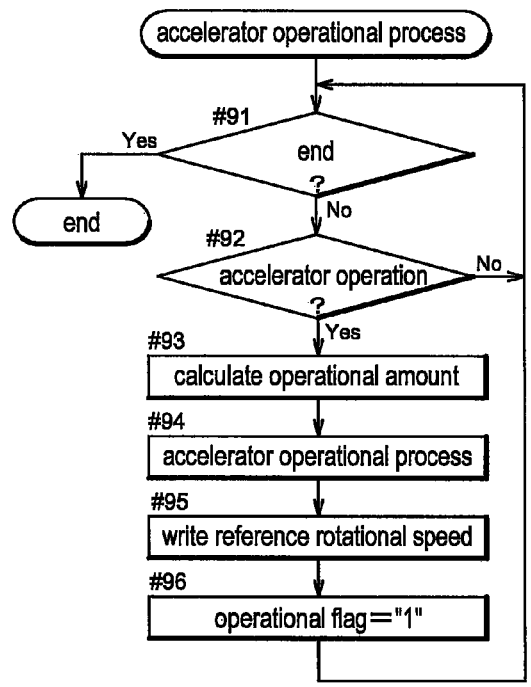
FIG. 11 is a flowchart illustrating the flow of an accelerator operational flow.

FIG. 11 illustrates an accelerator operation (engine rotational speed setting) process based on an operation of the accelerator lever 32. In this case too, the process checks presence/absence of issuance of an instruction for ending this accelerator operation (engine rotational speed setting) process (#91). In the case of absence of such ending instruction (NO branching at #91), the process then checks whether an accelerator operation using the accelerator lever 32 has been effected so far or not (#92). In the case of absence of such accelerator operation (NO branching at #92), the process returns to step #91. Whereas, in the case of presence of the accelerator operation (YES branching at #92), the process calculates its operational amount (#93). Further, based on the calculated operational amount, an accelerator operation process is effected (#94) and an engine rotational speed realized thereby is recorded as the reference engine rotational speed (#95). Lastly, the process sets "1" to the operational flag (#96). This accelerator operational process is effected in the engine ECU 5, whereas the reading of the recorded engine rotational speed and the content checking of the operational flag can be effected in the energy saving speed changing module 7.

Figure 7:
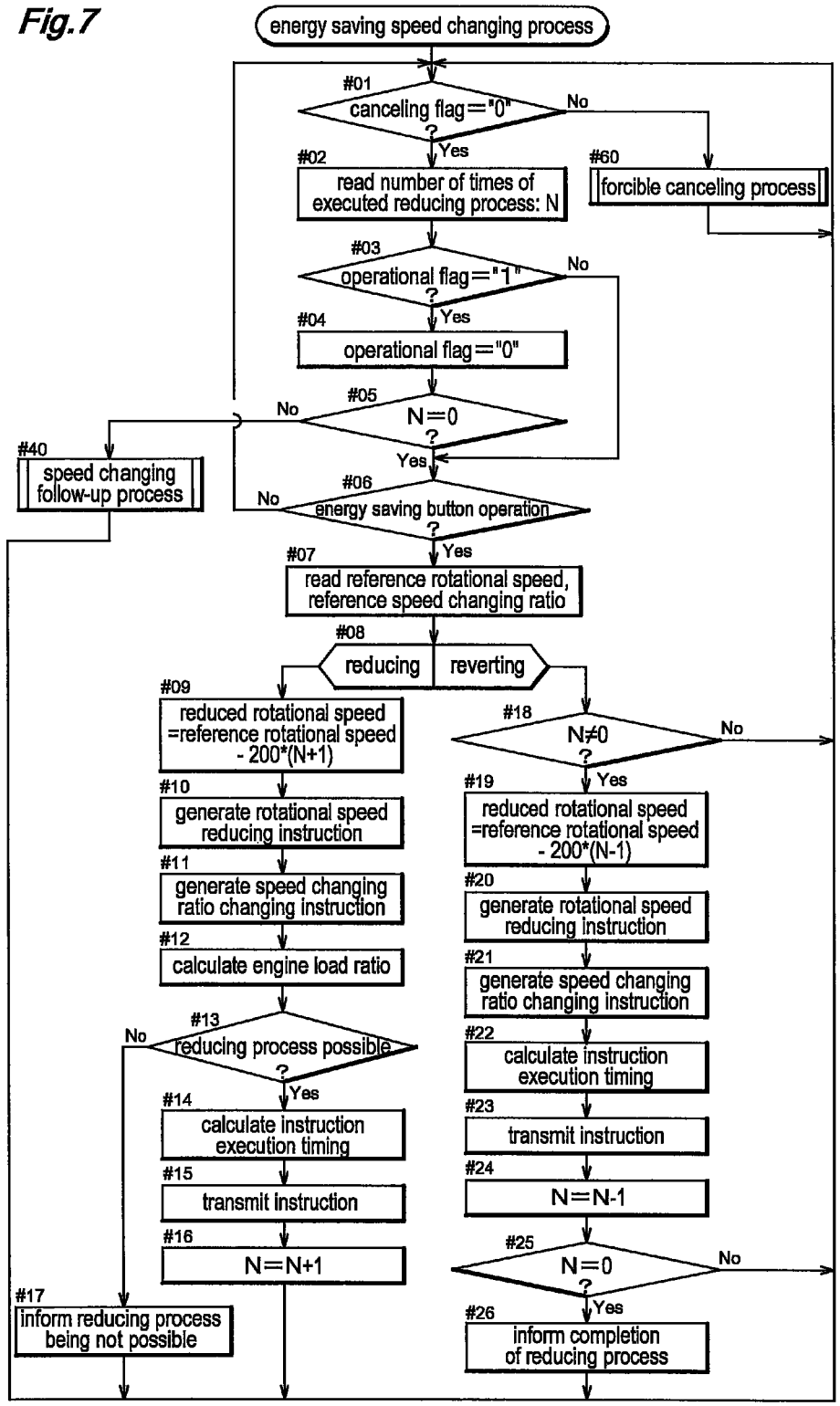
FIG. 7 is a flowchart illustrating one example of the flow of an energy saving speed change processing control in the speed changing control system.

Referring back to the flowchart of FIG. 7, if the content of the operational flag at step #03 is "1" (YES branching at #03), the content of the operational flag is rewritten with "0" (#04) and the process then checks whether the number of times: N is "0" or not (#05). If the number of times: N has a value other than "0" (NO branching at step #05), then, this means that the energy saving speed changing operation for reducing the engine rotational speed by the increment of 200 rpm has been conducted. Therefore, the process will execute a speed change follow-up process for carrying on the previously set engine rotational speed reducing setting even if the basic engine rotational speed or the basic speed change ratio is changed by execution of a manual speed change operation or accelerator operation. (#40). If the checking at step #03 shows the content of the operational flag being "0" (NO branching at #03) or the checking at step #05 shows the number of operations: N being "0" (YES branching at #05), the process then checks whether the reducing button 90 or the reverting button 91, which acts as the energy saving button, has been operated or not (#06). If the checking shows the energy saving button has not been operated (NO branching at #06), the process returns to step #01.

On the other hand, if the checking shows the energy saving button has been operated (YES branching at step #06), an engine rotational speed reducing process by a button operation described next will be executed. Firstly, the process reads out the current reference engine rotational speed and reference speed change ratio (#07). The process checks whether the energy saving button operation is an operation by the reducing button 90 or an operation by the reverting button 91 (#08).

[Case of Operation by Reducing Button 90]

This operational instruction means reducing the engine rotational speed by the unit of 200 rpm. Therefore, a reduced rotational speed as the target for energy saving is calculated (#09).

$$\text{reduced rotational speed} = \text{reference rotational sped} - 200 * (N+1)$$

where 'N' is the number of times of process executed

The process generates, for its delivery to the engine ECU 5, a rotational speed reducing instruction including the calculated reduction number of times (#10). Further, the process generates a speed change ratio changing instruction (#11), including one for a speed change ratio of the speed change ECU 6, so that a speed change ratio capable of maintaining the current vehicle speed with this reduced rotational speed may be calculated and then set to the speed change ECU 6. Based on the newly set engine rotational speed and speed change ratio, an engine load ratio is calculated (#12). Then, the process determines whether the current engine rotational speed reduction is permissible based on the calculated engine load ratio, e.g. with using a threshold value (#13). If it is determined that the engine rotational speed reduction is permissible (YES branching at #13), the process calculates an appropriate instruction execution timing which will result in minimum change in the vehicle speed after executions of the rotational speed reduction instruction and the speed change ratio changing instruction, and then describes this instruction execution timing in each of the instructions (#14). Then, the process transmits the rotational speed reducing instruction to the engine ECU 5 and transmits the speed change ratio changing instruction to the speed change ECU 6 (#15). Then, the process increments the number of process execution times: N and then returns to step #01 (#16). On the other hand, if it is determined that the engine rotational speed reduction is not permissible (NO branching at #13), the process informs that this reducing process of engine rotational speed is not possible, and then the engine rotational speed reduction by the current reducing button 90 operation is stopped and the process returns to step #01 (#17).

Incidentally, the determination at step #13 whether a reducing process is possible or not can include a condition of limiting the number of process execution times: N to be equal to or less than 4 times. That is, at the time of this determination, if (N+1) is greater than 5 (five), then, it is determined that the engine rotational speed reduction is not permissible and the process branches to step #17. If desired, this determination of possibility of reducing operation based on the number of process execution times: N can be effected as a priority determination condition, prior to step #09.

[Case of Operation by Reverting Button 91]

This operational instruction means reverting the engine rotational speed which was reduced by an operation(s) of the reducing button 90, by the unit of 200 rpm. Therefore, the process checks, in advance, whether an engine rotational speed reducing process(s) has been effected or not (#18). If the number of executed process times: N is found "0" indicating absence of engine rotational speed reducing process effected so far (NO branching at #18), this operation of the reducing button 90 is determined invalid. Hence, the process effects no process and returns to step #01. On the other hand, if the number of executed process times: N is found not "0", this means that one or more times of engine rotational speed reducing process has/have been effected so far. Therefore, the process will calculate a reduced rotational speed as a target to be used after the reverting process, based on the following formula (#19).

$$\text{reduced rotational speed} = \text{reference rotational sped} - 200 * (N-1)$$

where 'N' is the number of times of process executed

Next, the process generates, for its delivery to the engine ECU 5, a rotational speed reducing instruction including the calculated reduction number of times (#20). Further, the process generates also a speed change ratio changing instruction (#21) including a speed change ratio, so that a speed change ratio capable of maintaining the current vehicle speed with this reduced rotational speed may be calculated and then set to the speed change ECU 6. The process calculates an appropriate instruction execution timing which will result in minimal change in the vehicle speed after executions of the rotational speed reduction instruction and the speed change ratio changing instruction, and then describes this instruction execution timing in each of the instructions (#22). Then, the process transmits the rotational speed reducing instruction to the engine ECU 5 and transmits the speed change ratio changing instruction to the speed change ECU 6 (#23). Then, the process decrements the number of process execution times: N (#24). If the decremented number of process execution times N is "0" (YES branching at #25), this means that all of the engine rotational speed reduction processes have been cancelled. Therefore, this is informed by the process (#26) and returns to step #01. On the other hand, if it is found that the decremented number: N has a value other than "0" (NO branching at step #25), this means that the engine rotational speed reducing process is still maintained. Therefore, the process returns directly to step #01.

Figure 8:
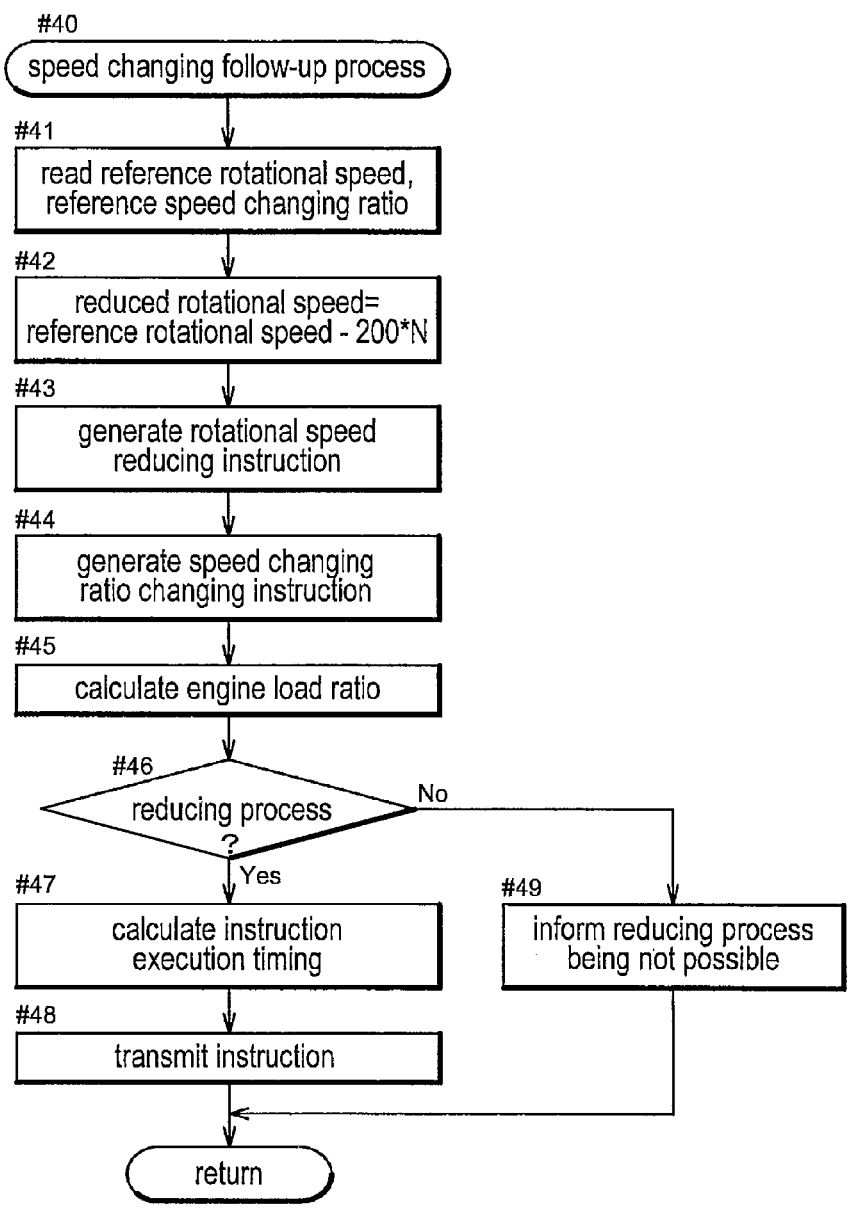
FIG. 8 is a flowchart illustrating an energy saving speed changing follow-up control in the energy saving speed change processing control of FIG. 7.

Next, with reference to the flowchart in FIG. 8, there will be described the above-noted speed change follow-up process for carrying on the previously set engine rotational speed reducing setting even if the basic engine rotational speed or the basic speed change ratio is changed by execution of a manual speed change operation or an accelerator operation. (#40).

Firstly, the process reads the reference rotational speed and the reference speed change ratio that have been updated in response to a new operation (#41). In order to carry on the engine rotational speed reducing setting, the reduced rotational speed is calculated again with using the updated reference rotational speed (reduced rotational speed=reference rotational sped−200*N, where 'N' is the number of times of process executed) (#42).

The process generates, for its delivery to the engine ECU 5, a rotational speed reducing instruction including the calculated reduction number of times (#43). Further, the process calculates a modified speed change ratio with taking this reduced rotational speed into consideration and generates a speed change ratio changing instruction including this modified speed change ratio (#44). Based on a newly set engine rotational speed and speed change ratio, an engine load ratio is calculated (#45). Then, the process determines whether the current engine rotational speed reduction is permissible based on the calculated engine load ratio, e.g. with using a threshold value (#46). If the engine rotational speed reduction is determined permissible (YES branching at #46), the process calculates an appropriate instruction execution timing which will result in minimal change in the vehicle speed after executions of the rotational speed reduction instruction and the speed change ratio changing instruction, and describes this instruction execution timing in each of the instructions (#47). Then, the process transmits the rotational speed reducing instruction to the engine ECU 5 and transmits the speed change ratio changing instruction to the speed change ECU 6 (#48). Then, the process ends this subroutine. On the other hand, if it is found that the engine rotational speed reduction is not permissible (NO branching at #46), the process informs that this reducing process of engine rotational speed is not possible (#49), and then the process ends this subroutine without executing the engine rotational speed reducing process.

Figure 9:
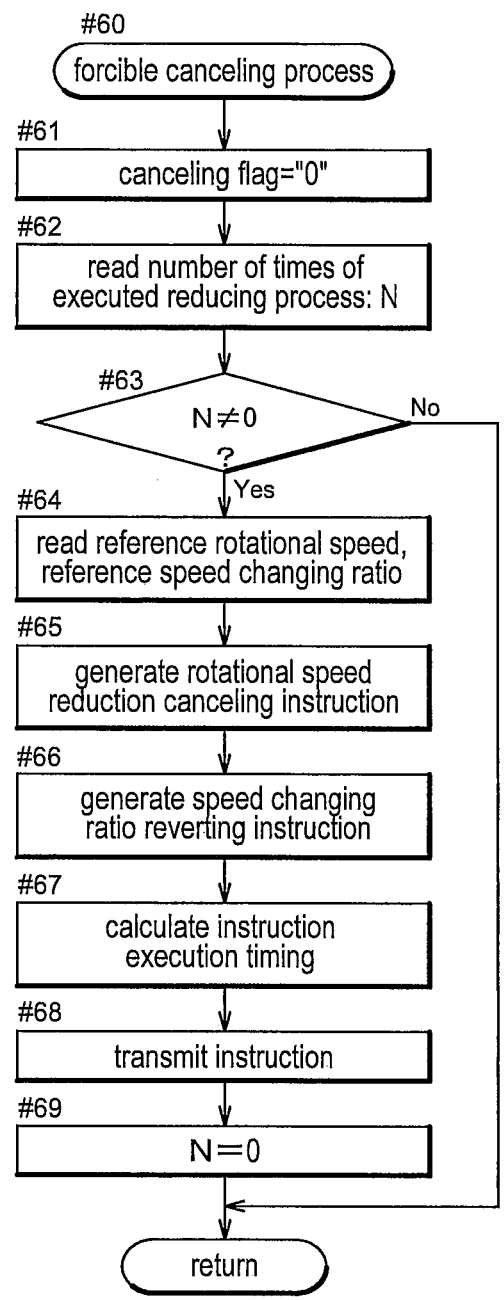
FIG. 9 is a flowchart illustrating a forcible canceling follow-up control in the energy saving speed change processing control of FIG. 7.

Next, with reference to the flowchart of FIG. 9, there will be described a forcible canceling process which is executed in case the forcible reverting control section 75 sets "1" to the canceling flag.

Firstly, the content of the canceling flag is rewritten with "0" (#61) and the number of executed process times: N indicative of the accumulated number of the currently set rotational speed reducing instructions is read out (#62). The process determines whether the read accumulated number of executed process times: N is "0" or not, that is, whether any rotational engine speed reducing process has been effected so far or not (#63). If no engine rotational speed reducing process is currently effected (NO branching at #63), there is no need to cancel this rotational speed reducing process, so the process ends this subroutine. On the other hand, if an engine rotational speed reducing process is being effected (YES branching at #63), the current reference engine rotational speed and reference speed change ratio are read out (#64). Then, the process generates a rotational speed reduction canceling instruction for canceling the currently implemented engine rotational speed reduction amount (#65) and generates also a speed change ratio changing instruction for reverting the currently implemented compensatory speed change ratio to the original reference change speed ratio (#66). Further, the process calculates an appropriate instruction execution timing which will result in minimal change in the vehicle speed after executions of the rotational speed reduction instruction and the speed change ratio changing instruction, and then describes this instruction execution timing in each of the instructions (#67). Then, the process transmits the rotational speed reducing instruction to the engine ECU 5 and transmits the speed change ratio changing instruction to the speed change ECU 6 (#68). Further, the process sets "0" to the value of the executed process times: N (#69) and ends this subroutine.

Figure 12:
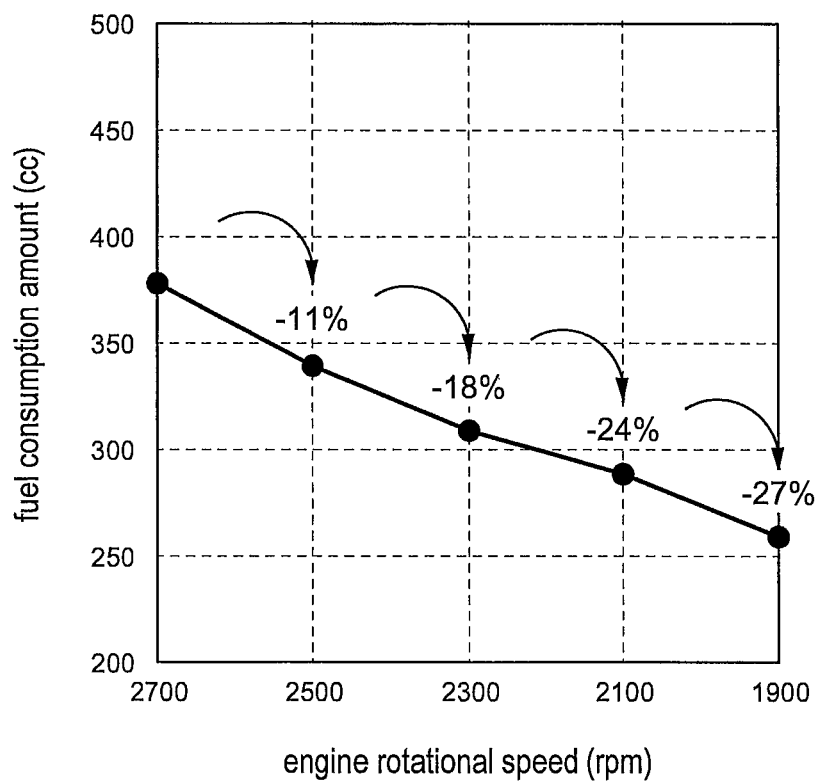
FIG. 12 is a graph showing relationship between a stepwise reduction in the engine rotational speed based on a plurality of times of rotational speed reducing instructions and the fuel consumption amount.
Figure 13:
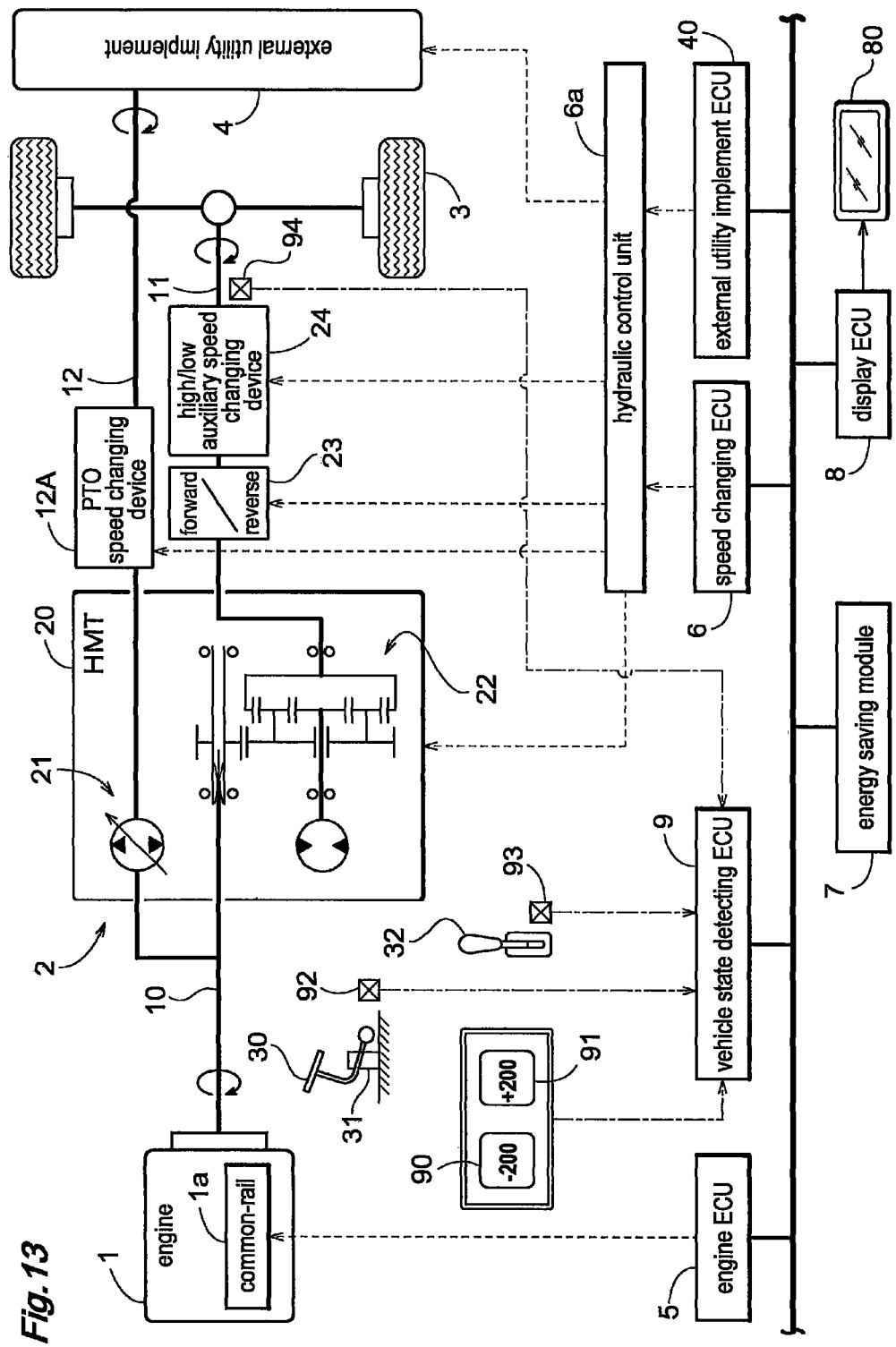
FIG. 13 is an explanatory view diagrammatically illustrating a speed changing control system according to a further embodiment.

As described above, the engine rotational speed reducing process of the present invention is suitable for reducing stepwise an engine rotational speed by a predetermined amount when the driver feels some spare amount in the power of the engine 1. With this, saving of energy consumption can be expected. For instance, FIG. 12 shows a graph which was obtained by an experimental evaluation of improvement in fuel consumption by such engine rotational speed reducing process. From this graph, it is understood that when the reference rotational speed is 2700 rpm, with one pressing operation of the reducing button 90, the fuel consumption can be improved by 10%. Incidentally, in the foregoing embodiment, for the sake of readiness of explanation, the control arrangement is configured to reduce the rotational speed by the unit of 200 rpm, regardless of the reference rotational speed. Instead of this, it is also possible to vary the unit rotational speed reduction amount in accordance with the reference rotational speed.

As described above, the engine rotational speed reducing process of the invention is vastly advantageous in that improvement of fuel consumption is realized without any substantive change in the vehicle speed. However, as reduction in engine rotational speed is linked with reduction in the power takeoff (PTO) rotational speed, the process may sometimes invite inconvenience in case the PTO work is done when the external utility implement 4 is being used with the power thereof supplied through the PTO transmission line 12. Yet, in the case of the arrangement as shown in FIG. 3 wherein the PTO transmission line 12 includes a multiple stage PTO speed changing device 12A for transmitting the rotational power of the engine 1 to the external utility implement 4, the process effects an alarming for prompting selection of a speed stage which will minimize the reduction in the PTO rotational speed by shifting up the speed stage of the PTO speed changing device 12A when the reduction in the PTO rotational speed becomes significant. As the PTO speed changing device 12A does not have many speed stages, setting a speed stage which will provide precise compensation for the reduction in the engine rotational speed will be difficult. Yet, it is still possible to select such a speed stage which will minimize the change in the PTO rotational speed. If the PTO speed change device 12A is configured to allow selection of its speed stage from the speed change ECU 6 via the hydraulic control unit 6a, it is possible to selectively link the engine rotational speed reduction to the speed stage of this PTO speed changing device 12A. Further, in case a stepless speed changing device is employed as the PTO speed changing device 12A, in the engine rotational speed reducing process of the present invention, the PTO rotational speed can be maintained substantially constant. Incidentally, the speed stage of the PTO speed changing device 12A can be grasped by providing a sensor to this end. More simply, the speed stage can be calculated based on the engine rotational speed and the PTO rotational speed.

In the foregoing explanation of the engine rotational speed reducing process with reference to the flowchart, for the sake of readiness of explanation, the predetermined amount for calculating the rotational speed reduced from the reference rotational speed is 200 rpm. However, this can be freely set. Also, this predetermined amount need not have a same value in the series of engine rotational speed reducing processes. Instead, the amount can be made to vary for each time of operation of the reducing button 90. Further, in case no spare amount exists in the speed change range of the HMT 20 at the time of operation of the reducing button 90 and thus setting a speed change ratio (speed increase) for compensating for reduction in the engine rotational speed by 200 rpm is not possible, then the process will determine or calculate a predetermined (approximate) amount (<200 rpm) of a reduced rotational speed which is suited to another speed change ratio that is settable by the HMT 20. In case such arrangement is employed, the reducing process history memory 73 will store data needed for reverting to the original state in response to a later reverting instruction, for instance, data about the reduction amount in the engine rotational speed and the set speed change ratio at the time of each operation of the reducing button 90. In more general, the lower range engine rotational speed to be included in the rotational speed reducing instruction to be given to the engine control unit 5 will be calculated such that the reduction in the engine rotational speed by this lower range engine rotational speed can be compensated for by a change in the speed change ratio in the HMT 20. To illustrate this with reference to FIG. 1, in response to input of a reducing operation signal, the degree or amount of spare in the speed change ratio (speed increase) is determined based on the current speed change ratio. And, based on this spare amount degree and the limit engine rotational speed reduction amount (e.g. 200 rpm), an engine rotational speed reduction amount to be implemented is calculated and a rotational speed reducing instruction indicative of this calculated reduction amount is given to the engine ECU 5.

In case there is no spare in the speed change ratio in the HMT 20, that is, in case the swash plate angle is currently at its limit, so that the change of speed change ratio for compensating for reduction in the engine rotational speed is not possible, this situation is determined as the reducing process being not permissible in the flowchart of FIG. 7. Hence, as a process for coping with impossibility of reducing process, an alarming of the process being not permissible is effected at step #17. As an alternative process for coping with impossibility of reducing process, it is also possible to temporarily accept the input of this reducing operation signal and to execute the engine rotational speed reducing process based on this reducing operation signal, later when the speed change ratio of the HMT 20 is reduced (i.e. speed decrease). If an arrangement is made to allow this acceptance of inputs of reducing operation signals for a plurality of times, the engine rotational speed reducing process will then be effected by an amount corresponding to the number of operations of the reducing button 90 to be applied to the change (speed decrease) in the subsequent speed change state of the HMT 20. That is, in case change of speed change ratio for compensating for reduction in the engine rotational speed is not possible, the delivery of the rotational speed reducing instruction to the engine ECU 5 will be delayed until such change becomes possible.

In the foregoing explanation of the engine rotational speed reducing process with reference to the flowchart, one or more events of engine rotational speed reductions executed in response to the reducing operational instructions by the operations of the reducing button 90 are cancelled one after another by respective reverting operational instructions by operations of the reverting button 91. This reverting operational instruction can be given to the energy saving speed changing module 7 by way of another operation. For instance, a change speed switchover instruction for switching over the high/low auxiliary speed changing device 24 from the low speed stage to the high speed stage can be taken as such reverting operational instruction for canceling the currently implemented engine rotational speed reduced state. In general, the high speed stage of the high/low auxiliary speed changing device 24 is used when the vehicle is traveling on the road and the accelerating operation is effected frequently. Under such driving condition in which the engine rotational speed changes frequently, it is better to cancel the engine rotational speed reducing process. Therefore, it is advantageous to cancel an engine rotational speed reducing process simultaneously with the switchover from the low speed stage to the intermediate speed stage or to the high speed stage. In such case, if a plurality of times of reducing operations have been effected so far, the rotational speed reduction could be reverted by one unit time amount only. However, it is preferred that the rotational speed reduction be reverted altogether by all of the number of times of the engine rotational speed reducing operations. It should be noted, however, that in order to avoid sudden change in the vehicle speed, the reverting of the engine rotational speed, that is, increase of the engine rotational speed, should preferably be effected slowly.

[Other Embodiments]

(1) In the foregoing embodiment, a stepless speed changing mechanism is employed and the driver can set the speed position steplessly. However, the speed changing control system of the present invention can be applied also to a multiple-stepped speed changing device. In that case, the compensatory speed change ratio will be selected as a speed stage which will give the nearest compensatory speed change ratio. Further, even with the arrangement using a stepless speed changing device, some of such arrangements allow stepwise speed position selection only, by means of a speed changing lever having a plurality of speed stages. For such speed changing device 2 also, the present invention can be applied. In case the reduction in the engine rotational speed and the associated compensatory change in the speed change ratio based on operations instructions via operational instruments are effected in a plurality of steps, an arrangement will be provided such that the reduction in the engine rotational speed and the associated compensatory change in the speed change ratio will also be effected in a plurality of steps.

(2) In case the present invention is applied to a stepwise speed changing device configured to provide a plurality of speeds by setting of a plurality of steps of speed change ratios, the reduction in the engine rotational speed and the associated compensatory change in the speed change ratio should be effected by a unit corresponding to one step of reduction in the engine rotational speed and the associated compensatory speed change ratio change based on operational instructions, advantageously.

(3) In the foregoing embodiment, an HMT is employed as a stepless speed changing device. However, the present invention can be applied even if an HST or a CVT is employed instead of the above.

(4) In the foregoing embodiment, the speed changing control system is employed in a tractor as an example of the vehicle. However, the present invention can be applied also to any other utility vehicle such as a rice planting machine, a combine, a grass mower, a backhoe, etc. or a passenger car, a truck, etc.

DESCRIPTION OF REFERENCE MARKS

1: engine
2: speed changing device
4: external utility implement
12: PTO transmission line
12A: PTO speed changing device
20: HMT (=hydro-mechanical speed changing mechanism) (main speed changing device)
21: HST (=hydrostatic speed changing mechanism)
22: planetary gear mechanism
23: forward/reverse switchover mechanism
24: auxiliary speed changing device
3: wheels
30: accelerator pedal (acceleration operational instrument)
32: speed changing lever (speed changing operational instrument)
4: external utility implement
5: engine ECU (engine control unit)
6: speed changing ECU (speed changing control unit)
7: energy saving speed changing module
74: engine load determining section
75: forcible reverting control section
9: vehicle state detecting ECU
90: reducing button (operational instrument)

91: reverting button (operational instrument)
92: pedal sensor
93: lever sensor

What is claimed is:

1. A speed changing control system for a vehicle including a speed changing device for speed changing a rotational power from an engine and outputting the resultant speed-changed power, the system comprising:
    a speed changing control unit for setting a speed change ratio of the speed changing device;
    an engine control unit for setting an engine rotational speed of the engine;
    an operational instrument for delivering an operational instruction in response to a driver's operation; and
    a speed changing module, wherein based on said operational instruction, speed changing module is configured to provide said engine control unit with a rotational speed reducing instruction for reducing an engine rotational speed set by said engine control unit by a predetermined amount, and wherein said speed changing module is configured also to request, to said speed changing control unit, a change of the speed change ratio for compensating for said reduction in the engine rotational speed by said rotational speed reducing instruction so as to maintain the vehicle speed.

2. The system according to claim 1, wherein said operational instrument is configured to be capable of delivering also a reverting operational instruction for canceling the reduction in the engine rotational speed and the associated compensatory change in the speed change ratio.

3. The system according to claim 2, wherein said engine rotational speed reduction and said compensatory speed change ratio change are implemented in a plurality of steps and the reduced engine rotational speed and the compensatory speed change ratio change are reverted in the plurality of steps in response to the reverting operational instruction.

4. The system according to claim 1, wherein the speed change ratios are set in a plurality of steps so as to provide a plurality of speeds and the engine rotational speed reduction and the compensatory speed change ratio change in response to the operational instruction corresponds to one step change of speed.

5. The system according to claim 1, wherein an engine rotational speed reducing process based on the rotational speed reducing instruction and a speed change ratio changing process based on the speed change ratio changing instruction are configured such that control timing thereof are adjusted relative to each other so as to reduce the amount of change in the vehicle speed.

6. The system according to claim 1, wherein the system further comprises an engine load determining section for determining whether an engine load has exceeded a predetermined level or not, and when it is determined that the engine load has exceeded the predetermined level, there is outputted a reverting operational instruction for canceling the reduction in the engine rotational speed and the associated compensatory change in the speed change ratio.

7. The system according to claim 1, wherein the system further comprises a forcible reverting control section configured to forcibly output, in response to establishment of a predetermined canceling condition, a reverting operational instruction for canceling the reduction in the engine rotational speed and the associated compensatory change in the speed change ratio.

8. The system according to claim 1, wherein when a speed change position is switched from a first speed change position which was set by the speed change operational instrument for operating the speed changing device to a second speed change position, the rotational speed reducing instruction which was provided for the first speed change position is carried on for the second speed change position.

9. The system according to claim 1, wherein when an accelerator position is switched from a first accelerator position which was set by the accelerator operational instrument for adjusting the engine rotational speed to a second accelerator position, the rotational speed reducing instruction which was provided for the first accelerator position is carried on for the second accelerator position.

10. The system according to claim 1, wherein a low-range engine rotational speed included in the rotational speed reducing instruction to be provided to the engine control unit is calculated in such a manner that the reduction in the engine rotational speed by this low-range engine rotational speed can be compensated for by the change in the speed change ratio by the speed changing control unit.

11. The system according to claim 1, wherein in case change in the speed change ratio for compensating for the reduction in the engine rotational speed is not possible by the speed changing control unit, the delivery of the rotational speed reducing instruction to the engine control unit is delayed until the change in the speed change ratio becomes possible.

12. The system according to claim 2, wherein said speed changing device consists of a main speed changing device for effecting the change of speed change ratio for compensating for the reduction in the engine rotational speed and an auxiliary speed changing device having a plurality of stages, and the reduction in the engine rotational speed and the associated compensatory change in the speed change ratio are cancelled based upon a speed change switching instruction for switching said auxiliary speed changing device from a low speed stage to a high speed stage.

13. The system according to claim 1, wherein a power takeoff (PTO) speed changing device is provided in a PTO transmission line for transmitting the rotational power from the engine to the external implement, and at the time of reduction in the engine rotational speed based upon the rotational speed reducing instruction, there is issued an alarm which prompts selection of a speed change potion that reduces the reduction in the PTO rotational speed by the PTO speed changing device.

* * * * *